US006389548B1

(12) United States Patent
Bowles (10) Patent No.: US 6,389,548 B1
(45) Date of Patent: May 14, 2002

(54) PULSE RUN-LENGTH MEASUREMENT FOR HF DATA SIGNAL BY DIVIDING ACCUMULATED PHASE DIFFERENCE BETWEEN FIRST AND SECOND ZERO-CROSSINGS BY SINGLE-CYCLE RANGE USING MULTIPLE CYCLE RANGE SAWTOOTH WAVEFORM

(76) Inventor: Liam Bowles, Silicon Systems Limited 32-34 Harcourt Street, Dublin 2 (IE)

( * ) Notice: Subject to any disclaimer, the term of this patent is extended or adjusted under 35 U.S.C. 154(b) by 0 days.

(21) Appl. No.: 09/289,620

(22) Filed: Apr. 12, 1999

(51) Int. Cl.[7] .......................... G06F 1/04; G01R 25/00; G01R 29/02; H03D 3/24; H04L 7/00

(52) U.S. Cl. .................... 713/500; 713/502; 702/57; 702/59; 702/189; 327/26; 327/31; 327/33; 327/45; 327/78; 327/79; 327/131; 332/109; 375/238; 375/239; 375/327; 375/353; 375/340; 375/355; 375/376

(58) Field of Search .......................... 713/400, 500, 713/501, 502, 503; 327/26, 31, 33, 36, 45, 78, 79, 131; 332/109; 348/537; 702/57, 66, 67, 69, 70, 79, 189; 375/376, 340, 238, 239, 327, 353, 355

(56) References Cited

U.S. PATENT DOCUMENTS 4,066,978 A * 1/1978 Cox, Jr. et al. ............. 331/1 A
4,502,024 A * 2/1985 Nishikawa et al. ......... 332/109

(List continued on next page.)

OTHER PUBLICATIONS

Stikvoort, EduardF., et al, "An All-Digital Bit Detector for Compact Disc Players", Jan. 1992, pp. 191–200, I.E.E.E. Journal on Selected Areas in Communications, vol. 10, No. 1.

Primary Examiner—Thomas Lee
Assistant Examiner—Tanh Q. Nguyen
(74) Attorney, Agent, or Firm—Richard K. Robinson (57) ABSTRACT

A system and method for accurately measuring a pulse run length in a high frequency (HF) data signal while utilizing a low analog-to-digital conversion (ADC) sampling rate. Four bits are added to the most significant end of an oscillator's accumulator register so that the oscillator generates a sawtooth clock waveform ranging in phase from zero (0) to $32\pi$ radians. An interpolator detects a first zero-crossing transition of the HF data signal at the leading edge of the pulse run length, and a phase detector measures a first phase increment at that time. The MSBs of the accumulator register is then initialized to place the measured first phase increment in a range between zero (0) and $2\pi$ radians. The accumulator register then accumulates phase increments until the interpolator detects a second zero-crossing transition of the HF data signal at the trailing edge of the pulse run length, and the phase detector measures a second phase increment when the second zero-crossing transition is detected. An accumulated phase difference is calculated by subtracting the initialized first phase increment from the measured second phase increment. The pulse run length is then obtained by dividing the accumulated phase difference by $2\pi$.

17 Claims, 4 Drawing Sheets

U.S. PATENT DOCUMENTS

| | | | | |
|---|---|---|---|---|
| 4,694,468 A | * | 9/1987 | Cullum | 375/224 |
| 4,802,009 A | * | 1/1989 | Hartmeier | 348/537 |
| 5,070,254 A | * | 12/1991 | Summers | 327/105 |
| 5,181,115 A | * | 1/1993 | Flamm et al. | 358/158 |
| 5,202,846 A | * | 4/1993 | Rasmussen et al. | 708/276 |
| 5,214,677 A | * | 5/1993 | Mori | 375/376 |
| 5,337,335 A | * | 8/1994 | Cloetens et al. | 375/376 |
| 5,355,171 A | * | 10/1994 | Miyazaki et al. | 348/505 |
| 5,586,144 A | * | 12/1996 | Kahlman et al. | 375/229 |
| 5,594,763 A | * | 1/1997 | Nimishakavi | 375/376 |
| 5,708,687 A | * | 1/1998 | Powell et al. | 375/376 |
| 5,790,613 A | * | 8/1998 | Tateishi | 375/376 |
| 5,946,363 A | * | 8/1999 | Rominger et al. | 375/376 |
| 5,969,631 A | * | 10/1999 | Ammler et al. | 340/825.21 |
| 6,249,558 B1 | * | 6/2001 | Fendt et al. | 375/361 |
| 6,278,747 B1 | * | 8/2001 | Hutchins et al. | 375/340 |
| 6,285,722 B1 | * | 9/2001 | Banwell et al. | 375/354 |
| 6,295,272 B1 | * | 9/2001 | Feldman et al. | 370/210 |
| 6,304,118 B1 | * | 10/2001 | Ikeno et al. | 327/159 |

* cited by examiner

PULSE RUN-LENGTH MEASUREMENT FOR HF DATA SIGNAL BY DIVIDING ACCUMULATED PHASE DIFFERENCE BETWEEN FIRST AND SECOND ZERO-CROSSINGS BY SINGLE-CYCLE RANGE USING MULTIPLE CYCLE RANGE SAWTOOTH WAVEFORM

BACKGROUND OF THE INVENTION

1. Technical Field of the Invention

This invention relates to digital signal processing and, more particularly, to an all digital phase-locked loop (ADPLL) circuit and method of recovering a bit clock signal from a sampled waveform.

2. Description of Related Art

Compact disc (CD) players suffer from several sources of signal degradation. For example, high-frequency phase fluctuations may be caused by jitter due to disc asymmetry. Low-frequency phase variation may be caused by wander due to player and/or disc eccentricity. In addition, disc imperfections such as "black dot" cause loss-of-signal indications, and scratches on the disc cause persistent loss-of-frame indications. Also, excessive asymmetry may disturb the frame synchronization by causing, for example, an 11T/11T frame synchronization sequence to appear as a 10T/12T or 12T/10T sequence.

The high frequency (HF) signal from the CD "pickup" is digitized, equalized (via digital filtering), and the direct current (DC) component is eliminated through a slicing operation to form a sampled waveform. If the slicing threshold is not correct, errors in measured run lengths (pulse lengths in the input data waveform) and phase errors can result. Finally, errors in angular velocity may cause signal distortion.

Figure 1:
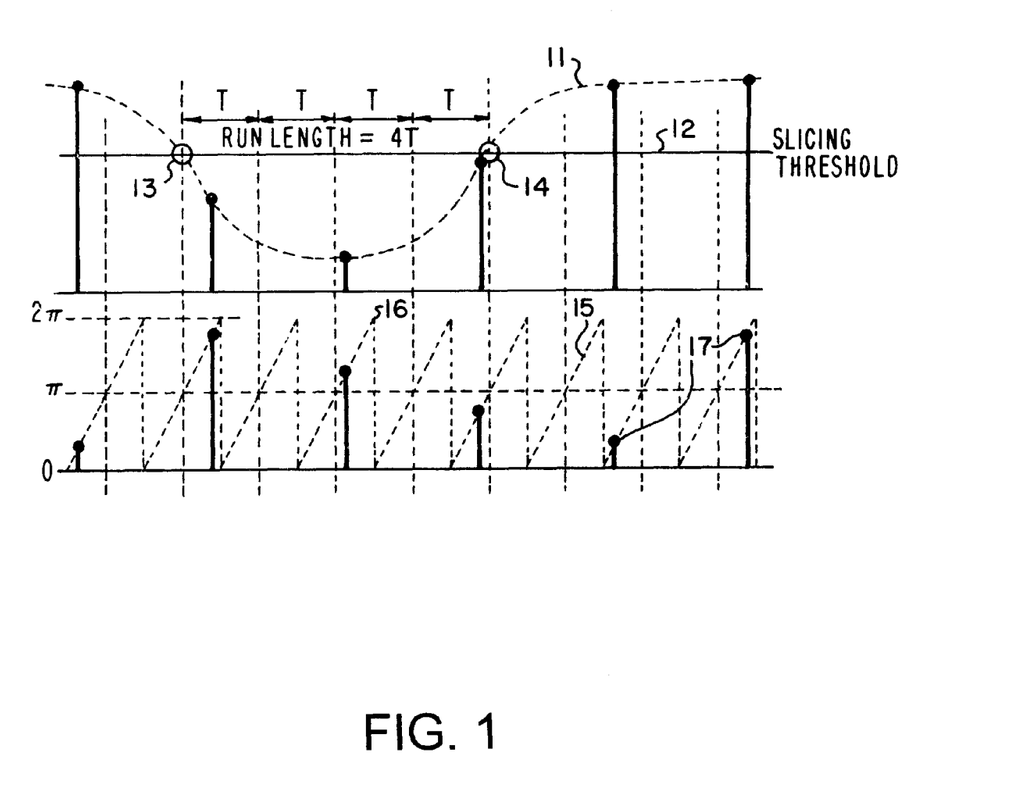
FIG. 1 (Prior Art) is an illustration of a typical analog HF signal a CD pickup shown on the same time scale with a standard sawtooth waveform of a clock signal.

FIG. 1 is an illustration of a typical analog HF signal 11 from a CD pickup shown on the same time scale with a standard sawtooth waveform of a clock signal. The CD pickup converts the reflected light from the surface of the CD to the analog HF signal. A slicing threshold 12 for elimination of the DC component is also indicated; the intersections of the waveform and the slicing threshold mark waveform transitions 13 and 14. The data that is taken off the CD is encoded in the length of the pulses in the analog HF signal 11. Therefore, it is very important to measure the pulse lengths (run lengths) correctly.

FIG. 1 illustrates one waveform pulse having a run length of 4T, where T is the period of an embedded clock signal. An illustration of a standard sawtooth waveform 15 of an embedded clock (oscillator) signal is provided below the analog HF signal using the same time scale. The clock signal is generated by a conventional digital oscillator with a range from zero (0) to $2\pi$ radians. Normally, samples are taken much more frequently than shown; however, the principles illustrated are the same.

Utilizing conventional techniques to measure run length, a counter simply measures the number of clock pulses during a waveform pulse. The clock utilizes a $2\pi$ accumulator. Every time the accumulator overflows, a discontinuity (vertical clock edge) 16 occurs. The clock edges 16 are then counted between transitions 13 and 14 (i.e., between intersections of the waveform and the slicing threshold) in the incoming data waveform (HF signal) 11 in order to measure the run length. This is effectively counting multiples of $2\pi$ in phase. Every time the oscillator goes through $2\pi$ phase, equates to one bit period.

Superimposed on the sawtooth clock waveform of FIG. 1 is a stem diagram illustrating the digitized and sampled data points 17 extracted from the analog HF signal 11. The data points must be joined together to obtain a digitized waveform. However, as can be seen from FIG. 1, there is no way of identifying the transitions; and therefore, no way of knowing if an accumulator is running at the correct rate or how many clock periods are present between transitions. Therefore, the run length is not measurable.

Traditionally, when using digital signal processing (DSP) techniques for clock recovery, the sampling rate is very fast. The oscillator which produces the clock waveform 15 includes an accumulator that accumulates the phase increment produced during each analog-to-digital conversion (ADC) sample period (approximately 16 MHZ). For low bit rates (for example, 1×CD spin speed producing a maximum bit rate of approximately 4 MHZ), this update rate is sufficient for run length detection. However, for higher bit rates (for example, 4×CD spin speed producing bit rates of approximately 16 MHZ, the update rate is approximately equal to the ADC sample rate and is, therefore, too coarse for run length detection. It is not economically practical (or even possible) to sample quickly enough to accurately measure the run length utilizing conventional methods.

There are no known prior art teachings of a solution to the aforementioned deficiencies and shortcomings such as that disclosed herein.

In order to overcome the disadvantages of existing CD players, it would be advantageous to have an HF synchronization circuit and method for correcting the above problems. In particular, it would be advantageous to have a method of accurately measuring run lengths while utilizing a low sampling rate. The present invention provides such a circuit and method.

SUMMARY OF THE INVENTION

In one aspect, the present invention is a method of accurately measuring a pulse run length in a high frequency (HF) data signal while utilizing a low analog-to-digital conversion (ADC) sampling rate. The method includes the steps of generating a sawtooth clock waveform, ranging in phase from zero (0) to $32\pi$ radians, with an oscillator having an accumulator register. This is followed by detecting a first zero-crossing transition of the HF data signal at the leading edge of the pulse run length and measuring a first phase increment when the first zero-crossing transition is detected. The method then initializes the most significant bits (MSBs) of the accumulator register to adjust the measured first phase increment so that it lies in a range between zero (0) and $2\pi$ radians and then accumulates phase increments until a second zero-crossing transition of the HF data signal is detected at the trailing edge of the pulse run length. This is followed by measuring a second phase increment when the second zero-crossing transition is detected, calculating an accumulated phase difference by subtracting the first phase increment from the measured second phase increment, and dividing the accumulated phase difference by $2\pi$ to obtain the pulse run length.

In another aspect, the present invention is a method of recovering an embedded bit clock in successive transitions of a digitized high frequency signal. The method comprises the steps of generating a sawtooth waveform having a phase from 0 to a predetermined multiple of $2\pi$ radians. The phase of the sawtooth waveform is initialized in a range of between 0 and $2\pi$ radians beginning at a first transition of the high frequency signal. At a second transition of the high frequency signal, an end of the sawtooth waveform is determined. The number of 2π radians in the generated sawtooth waveform between the first and second transitions of the high frequency signal is counted. The bit clock in successive transitions of the digitized high frequency signal is recovered by dividing the number of 2π radians counted between the first and second transitions by 2π.

In another aspect, the present invention is a system for accurately measuring a pulse run length in a high frequency (HF) data signal while utilizing a low analog-to-digital conversion (ADC) sampling rate. The system includes an oscillator which generates a sawtooth clock waveform ranging in phase from zero (0) to 32π radians and accumulates phase increments in its accumulator register. The system also includes an interpolator which detects a first zero-crossing transition of the HF data signal at the leading edge of the pulse run length and which detects a second zero-crossing transition of the HF data signal at the trailing edge of the pulse run length. A phase detector measures a first phase increment when the interpolator detects the first zero-crossing transition and measures a second phase increment when the second zero-crossing transition is detected. The system also includes means for initializing the MSBs of the accumulator register to adjust the measured first phase increment so that it lies in a range between zero (0) and 2π radians, means for calculating an accumulated phase difference by subtracting the first phase increment from the measured second phase increment, and means for dividing the accumulated phase difference by 2π to obtain the pulse run length.

In another aspect, the present invention is to a system for accurately measuring a pulse width in a high frequency signal that utilizes a low sampling rate. The system comprises an oscillator generating a sawtooth clock waveform that ranges in phase from zero (0) to a multiple of 2π radians. The oscillator has an accumulator register that accumulates phase increments. An interpolator detects a first transition of the signal at a leading edge of the pulse and a second transition of the signal at a trailing edge of the pulse. A phase detector measures the oscillator phase when the interpolator detects the first transition and a second phase increment when the interpolator detects the second transition. Apparatus initiating the accumulator register most significant bits (MSBs) adjusts the measured first phase increment to lie in a range between zero (0) and 2π radians. Apparatus for calculating an accumulated phase difference subtracts the initialized first phase increment from the measured second phase increment and divides the accumulated phase difference by 2π to obtain the pulse width.

In another aspect, the present invention is to a high frequency control circuit. The circuit comprises an analog to digital converter to convert a high frequency analog signal into a high frequency digitized signal. An equalizer boosts the amplitude of narrower pulses while introducing minimal additional inter-symbol interference of the high frequency digitized signal into a high frequency digitized, equalized signal. A high-pass filter slices a direct current component from the digitized, equalized signal into a digitized, equalized and sliced high frequency signal. A high frequency synchronization control loop includes an all digital locked loop for recovering a bit clock embedded in a digitized high frequency signal. The control loop has a phase detector providing a digital output in response to a transition of the digitized high frequency signal. A low pass filter provides an output frequency signal in response to the digital output signal from the phase detector. A variable oscillator provides a sawtooth waveform signal ranging in phase from 0 to a predetermined multiple of 2π radians to the phase detector in response to the output frequency from the low pass filter. A radians number signal representing an accumulation of the number of radians is provided to the phase detector at the first transition of the high frequency signal and at the second transition of the high frequency signal. A measuring device provides a frequency, phase signal in response to the accumulated radians number signal and a preselected constant of 2π radians.

BRIEF DESCRIPTION OF THE DRAWINGS

The invention will be better understood and its numerous objects and advantages will become more apparent to those skilled in the art by reference to the following drawings, in conjunction with the accompanying specification in which.

DETAILED DESCRIPTION OF EMBODIMENTS

The present invention is a HF synchronization (hfSync) circuit which utilizes an All-Digital Phase Locked Loop (ADPLL) to recover a bit clock signal embedded in the HF signal from the pickup of a compact disc (CD) player. The ADPLL rejects high frequency phase fluctuations, but tracks low frequency phase variation. When there is a loss-of-signal indication (due, for example to black dot) or persistent loss of frame (due, for example to a scratch on the disc), the circuit free-runs until the error indication is removed. The hfSync circuit also corrects frame synchronization errors caused by excessive asymmetry, such as an 11T/11T sequence appearing as a 10T/12T or 12T/10T sequence. The circuit also reports measured run lengths and phase errors which may be utilized to determine the correctness of the DC slicing operation performed on the HF pickup signal prior to its input to the hfsync circuit. The circuit also supports operation in the Constant Access Velocity (CAV) mode and in the Constant Linear Velocity (CLV) mode. When in the CLV mode, the current bit rate may be read from one of the circuit's registers. This information may be utilized in a servo loop operation to set the angular velocity to its correct value. The circuit supports variable input sample rates and provides important parameters and status information to the CD player's controlling processor. Finally, the hfsync circuit accurately measures waveform run lengths while utilizing a low sampling rate.

Figure 2:
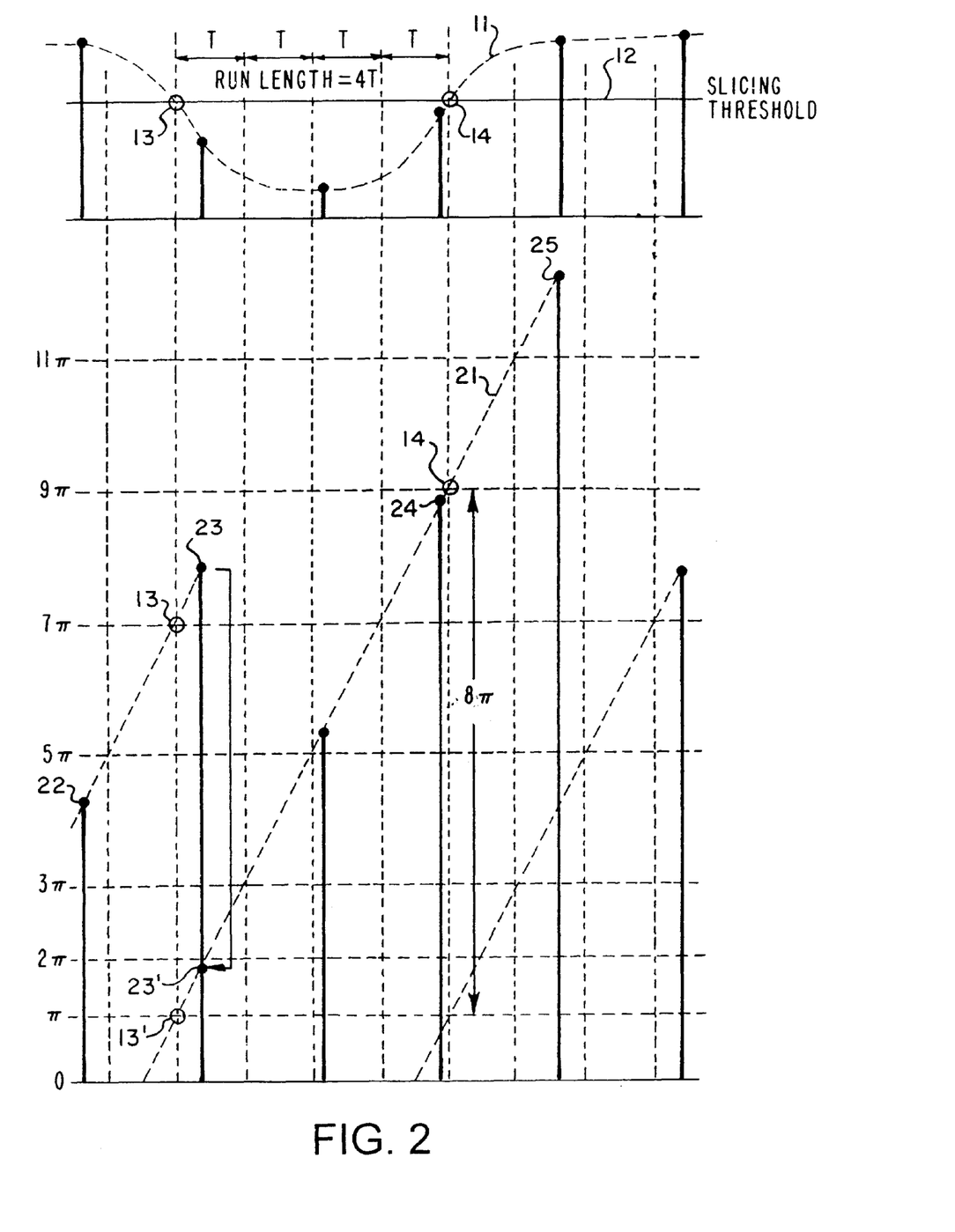
FIG. 2 is an illustration of the method of recovering data from the HF signal of FIG. 1 while utilizing a low sampling rate, in accordance with the teachings of the present invention.

FIG. 2 is an illustration of the method of recovering data from the HF signal 11 of FIG. 1 while utilizing a low sampling rate, in accordance with the teachings of the present invention. A sawtooth clock waveform 21 is illustrated. The clock waveform 21 is the same oscillator waveform as waveform 15 of FIG. 1, except that an extra four bits are added to the most significant end of the accumulator register. In FIG. 1, the sawtooth clock waveform ranged in phase between 0 and 2π radians. With the extra 4 bits, the phase range of the clock waveform 21 is multiplied by 16. Thus, in the method of the present invention, the phase may range between 0 and 32π radians, although FIG. 2 only illustrates a portion of this range up to approximately 12π, as shown by the vertical axis. Briefly, when the slicing threshold is crossed (referred to as the zero-crossing transition) 13 of the HF signal (data waveform) 11 is computed at the beginning of a run length, the accumulator is initialized to 13'. The accumulator then accumulates the phase until the next transition 14 of the data waveform occurs. The time period between transitions 13 and 14 is less than the time required for a phase of 32π to accumulate; therefore, the discontinuities 16 of FIG. 1 do not occur. This enables the system to keep track of the total phase that accumulates during a run length. The accumulated phase between transition 13' and transition 14 of the incoming data waveform is then divided by 2π to obtain the run length.

The method of measuring the run length will now be described in more detail. The location of the first transition 13 is determined by linearly interpolating between HF sample 22 and HF sample 23. Following the transition detection, the phase measurement of HF sample 23 is initialized to fall within the 0 to 2π range at position 23'. Keeping the relative position of the first transition 13 to HF sample 23 constant, causes the first transition 13 to map to position 13'. In the example shown in FIG. 2, the phase measurement at 13' is π radians. A linear interpolation is then performed between HF sample 24 and HF sample 25 to determine the location of transition 14. In the example shown in FIG. 2, the phase measurement at 14 is 9π radians. The phase difference between transitions 13' and 14 is then calculated as 9π−π=8π radians. Dividing 8π by 2π then gives the run length of 4.

Figure 3:
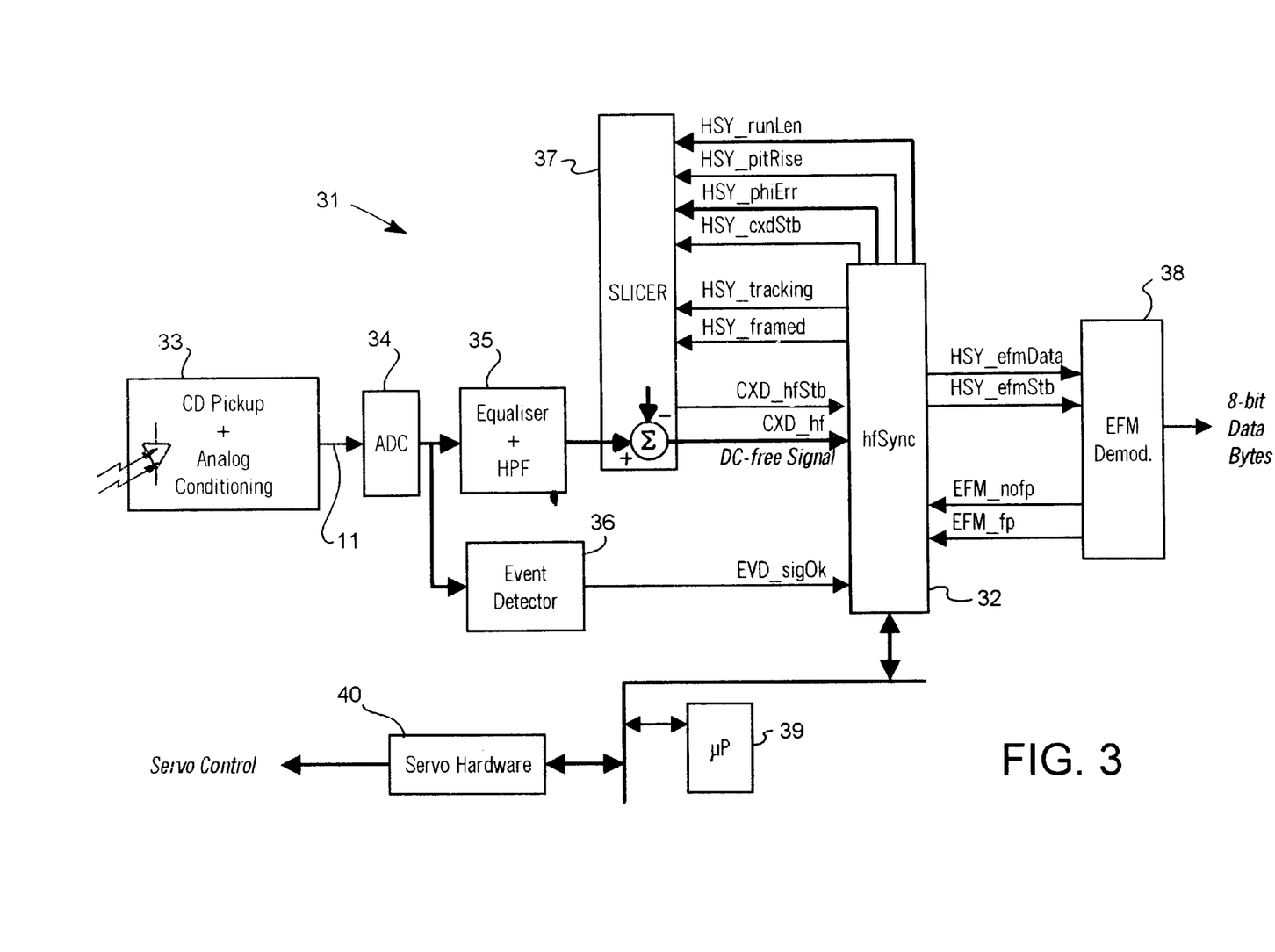
FIG. 3 is a functional block diagram of a compact disc (CD) player illustrating the relationship of the HF Synchronization circuit (hfsync) of the present invention to other final blocks.

FIG. 3 is a functional block diagram of a compact disc (CD) player 31 illustrating the relationship of the HF Synchronization (hfSync) circuit 32 of the present invention to other functional blocks. A CD pickup and analog conditioning circuit 33 converts the reflected light from the surface of the CD to the analog HF signal 11 of FIGS. 1 and 2 and pre-amplifies the signal. The signal then enters an analog-to-digital converter (ADC) 34 where the signal is converted to a sampled waveform. The waveform then enters an equalizer and high pass filter (HPF) circuit 35. Some equalization of the HF signal is required to compensate for the low-pass response of the modulation channel (i.e., the combined response of optics and pickup circuitry). Equalization boosts the amplitude of narrower pulses while introducing minimal additional inter-symbol interference (ISI). The HPF eliminates the direct current (DC) offset introduced by the pickup's photodiode.

The HF signal is also sent from the ADC 34 to an event detector 36 which monitors the incoming HF signal for changes in signal state (for example, signal dropout, mirror level, etc.).

From the equalizer and HPF circuit 35, the HF signal enters a slicer 37. The function of the slicer is to reduce the effects of inaccuracies in CD manufacture, most notably asymmetry due to under or over etching of the disc during the mastering process. These inaccuracies can result in significant deviations of the slope of pit/land and land/pit transitions from their nominal values. These deviations introduce an additional DC component in the HF signal and can significantly alter the measured run lengths. The slicer 37 introduces a dynamically moving offset (the slicing threshold) which, when applied to the HF signal, enables run lengths to be reliably measured as the time between "zero crossings". The slicing threshold comprises two components: an average value threshold adjusted so that the integral of the HF signal after application of the slicing threshold is as close as possible to zero and a dynamically varying adjustment of the average threshold which compensates for asymmetry.

Thus, the hfSync circuit 32 receives an HF signal that is essentially DC-free. An ADPLL in the hfSync circuit recovers a bit clock from the HF signal by locking its oscillator to the transitions in the HF signal. The clock is then utilized to measure the run lengths in the HF signal and to then regenerate a clean eight-to-fourteen modulation (EFM) waveform. The EFM waveform is sent to an EFM demodulation circuit 38 which extracts the original data values.

The hfSync circuit 32 is controlled/monitored via a processor interface to a microprocessor ($\mu$P) 39. Extracted HF signal information is communicated to servo hardware loops 40 via interrupts.

Figure 4:
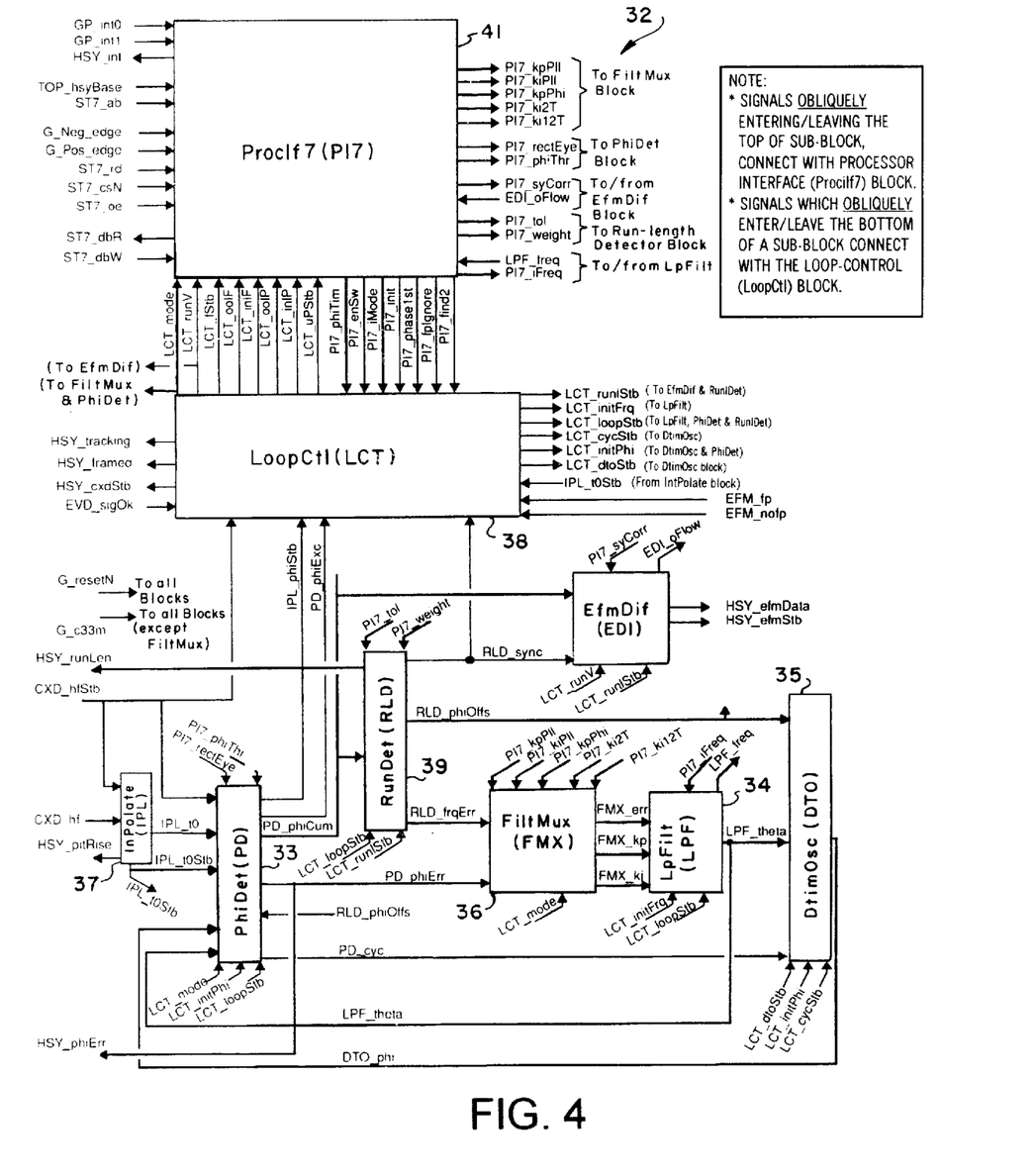
FIG. 4 is a functional block diagram of the HF Synchronization circuit (hfSync) of FIG. 3.

FIG. 4 is a functional block diagram of the HF Synchronization circuit (hfsync) 32 of FIG. 3. The core of the hfSync circuit 32 is a control loop which, at different stages in the clock recovery process, functions as either a frequency loop, a phase loop, or an ADPLL (i.e., a frequency and a phase loop). The control loop comprises four elements: a phase detector (PhiDet) 33, a low pass filter (LpFilt) 34, a variable oscillator (DtimOsc) 35, and a multiplexing circuit (FiltMux) 36 which selects loop error sources and loop gains to allow reconfiguration of the loop.

An interpolator (IntPolate) 37 uses linear interpolation to estimate the exact time of zero crossing transitions of the HF signal 11 (FIGS. 1 and 2) based on data sample values. This is required for accurate phase detection. A loop controller (LoopCtl) 38 controls all loop functions for the frequency loop, phase loop, and ADPLL loop. A run length detector (RunlDet) 39 monitors run lengths received on the HF signal 11 and generates frequency loop errors when the run lengths are outside the range of 3T to 11T. The hfSync circuit is configured by a ST7 microprocessor via a processor interface (ProcIf) 41. The ProcIf 41 controls the LoopCtl circuit 38 to coordinate the signal processing activity in the hfsync 32. Finally, run lengths decoded utilizing the ADPLL's output clock are regenerated and transmitted by an EFM demodulator interface (EfmDif) 42 downstream for EFM demodulation.

After the interpolator 37 estimates the exact time of zero crossing transitions of the HF signal 11, the phase detector 33 calculates the phase when the transition occurred. This measurement is essentially the phase error of the ADPLL loop. The phase error passes through the multiplexing circuit 36 before entering the low pass filter 34. The low pass filter implements a first-order IIR filter forming a Proportional Integral (PI) function. The output of the low pass filter represents the current ADPLL output frequency in units of phase-increment per ADC-sample period (the interval between consecutive ADC data samples). The variable oscillator 35 then accumulates this value each ADC-sample period to generate the loop output clock.

To achieve the required wide capture range, a frequency loop is employed to calculate the approximate bit rate before actually attempting to phase lock. Once this bit rate has been estimated, it can be used as an initial condition for the ADPLL, thus ensuring that the ADPLL's output frequency is in the correct region when it attempts to lock on. The frequency loop is implemented by reconfiguring the low pass filter 34 as a simple integrator and using the run length detector 39 to generate the loop error signal. Whenever a run length violates the EFM coding rules (i.e., run length is less than 3 or greater than 11), the run length detector 39 generates an error value which, after being integrated by the low pass filter 34, adjusts the output frequency of the variable oscillator 35 to minimize the error.

When the run length detector 39 has detected valid frame synchronization (i.e., two consecutive run lengths of 11), it calculates the phase adjustment required to center the output clock of the variable oscillator 35 to the last frame synchronization run length. This offset is applied to place the oscillator phase very close to its correct value. This creates a good initial condition for the phase loop which sets the correct oscillator phase once the frequency lock has been established. In this mode, the phase detector 33 generates the loop error, and the low pass filter's integration term is held constant. Thus, the frequency calculated by the frequency loop remains unaltered during phase loop operation.

Phase lock is deemed to have occurred when the phase error remains below a user-specified threshold for a user-specified number of consecutive run lengths. Once these criteria have been satisfied, the loop may be reconfigured to operate as an ADPLL, with both the proportional and integral terms of the low pass filter 34 contributing to its output. This allows changes in phase and frequency to be tracked.

Turning now to FIG. 3, there is shown a high frequency synchronization circuit (hfsync block) interfacing with other functional blocks circuits in a compact disk (CD_player)33.

When an Analog to Digital Converter (ADC) 33 converts a sample waveform, some equalization of the high frequency (HF) signal is required to compensate for the low-pass response of the modulation channel (i.e. the combined response of optics and pickup circuitry). This equalization boosts the amplitude of narrower pulses, while introducing minimal additional inter-symbol interference, i.e. minimal distortion of the HF pulse widths whose run lengths represent the encoded data.

A high-pass filter in Equalizer 35 is used to eliminate the DC offset introduced by a photodiode in pickup 33. The resultant signal should now be relatively DC free as the Eight to Fourteen Modulation(EFM)coding algorithm ensures minimal DC content in recorded Non Return to Zero Inverted (NRZI) waveform. For a perfectly manufactured CD, the encoded data could now be determined by measuring the run lengths as the time between consecutive "zero-crossings" of the HF signal.

However, inaccuracies/tolerances in CD manufacture (most notably, asymmetry due to under or over etch of disc during mastering process) can result in significant deviations of the slope of pit/land and land/pit transitions, from their normal values. These deviations introduce an additional DC component in the HF signal, and can significantly alter the measured run-lengths if a "zero-crossing" is considered to be the moment of an NRZI transition.

To compensate for asymmetry, a slicing circuit 31 (slicer) produces a dynamically moving offset. When applied to the HF signal, this offset allows run lengths to be reliably measured as the time between "zero-crossings". The slicing threshold is the sum of two components an average value and a dynamically varying adjustment.

The "average" value adjusts so that the integration of the CXD_hf signal (i.e. the HF signal after application of the slicing threshold) sign bit is as close as possible to zero.

The circuit generating this value has a long (w.r.t. maximum run-length) time constant and is essentially static over several pits/lands. The response time of the loop is short enough however to track slow variations in the HF signal level caused by things, such as fingerprints.

The average value ensures that the slice threshold remains in the right "ball-park" as the EFM coding rules ensure that integration of the NRZI waveform over time is close to zero.

A dynamically varying adjustment compensates for asymmetry.

Slicer 37 monitors the phase error detected by the hfSync's Digital Phase Locked Loop (DPLL). The value HSY_phiErr is the phase error and the signal HSY_pitRise indicates the direction of the HF transition to which it applies, and adjusts the threshold to minimize the difference between consecutive phase errors.

Having a time constant that is significantly longer than the maximum possible run length, the phase error detected by the DPLL will not vary dramatically from transition to transition. Thus, any significant difference between consecutive phase errors may be deemed primarily due to asymmetry and a corrective adjustment is made to minimize this difference.

Further, adjustment of the slice threshold to minimize the difference between successive phase errors causes the time between threshold crossing to tend towards an integral number of DPLL output clock periods.

To verify that hfSync block 32 is adjusting the threshold correctly, slicer 37 monitors the run lengths detected by the run length detector in hfsync block 32 to check that the run lengths lie in the allowed range of 3T–11T. Value HSY_runlen is the detected run length and HSY_pitRise indicates whether it applies to a pit or a land.

Thus, hfsync block 32 receives a HF signal that is essentially DC-free. An All Digital Phase Locked Loop 6 (ADPLL) in this block recovers a bit clock from the HF signal by locking its oscillator to the transitions in the HF signal. The phase detector used can only tolerate phase errors in the range of $-\pi \rightarrow +\pi$. To compensate for this, a frequency loop is employed to determine the approximate correct frequency. This frequency value is used as an initial condition for the ADPLL loop to reduce its task to one of phase correction and tracking.

The ADPLL loop response time is set fast enough to track low-frequency phase variations ("wander"), such as those due to disc/player eccentricity, but slow enough to reject or average out high-frequency jitter due to slicing errors.

Turning now to FIG. 4, a functional block diagram of hfsync loop 32 is shown.

The core of the hfsync block 32 is a control loop that functions at different stages in the clock recovery algorithm as either a frequency-loop, a phase-loop or an ADPLL, (a frequency and phase loop).

The control loop comprises four elements: a phase detector block 33 (PhiDet), a low-pass filter block 34 (LpFilt) and a variable oscillator block 35(DtimOsc). To allow reconfiguration of the loop, a multiplexing circuit 33(FiltMux block) is required to select the correct source for the loop error, and the correct loop gains.

An Interpolator circuit 37 (IntPolate block) uses linear interpolation to estimate the exact time at which a logic transition occurred in the CXD_hf input stream. This is necessary for accurate phase detection.

Run lengths decoded using the ADPLL's output clock are regenerated and transmitted by the EfmDif block to the "downstream" block for EFM demodulation.

The run length detector 39 (RunlDet block) monitors run lengths received on CXD_hf and generates frequency errors when run lengths outside the permitted range (i.e. 3–11) are received.

The hfsync is configured by an ST7 processor via the Procif sub block 41. The Procif sub block in turn controls the LoopCtl sub block that coordinates the signal processing activity in the hfsync.

The incoming signal from the CD pickup has its DC level removed before entering hfSync 32 block through the INP__hf block pin. When a transition occurs in the incoming EFM stream indicating the phase of this signal is a multiple of $2\pi$, the sign of the INP__hf sample value changes. The IntPolate block 37 detects this sign change and uses linear interpolation to generate a value (on signal, IPL__t0) that is an estimate of the exact time between the two sampling instants at which the 'crossover' occurred. The phase detector can then extrapolate back from the oscillator phase at the sampling instant following the crossover to calculate the DtimOsc phase when the crossover occurred. This phase is essentially the phase error (signal, PD__phiErr) of the ADPLL loop.

For loop control, the phase error passes through a multiplexer 36 (FlltMux block) before entering the LpFilt block. This block implements a first-order IIR filter forming a PI (Proportional Integral) function. The LpFilt output (LPF-freq signal) represents the current ADPLL output frequency in units of phase-increment per ADC-sample period1. The DtimOsc then simply accumulates this value each ADC-sample period to generate the loop output clock.

To achieve the required wide capture range in frequency detection, a frequency loop is employed to calculate the approximate bit rate before actually attempting to phase lock. Once this bit rate has been estimated, it can be used as an initial condition for the ADPLL, to ensure that the ADPLL's output frequency is in the correct region when it attempts to "lock-on".

The frequency loop is implemented by reconfiguring the low-pass filter (LpFilt Block) as a simple integrator (the proportional term being held at zero)and using a run length detector (the RunIDet Block) to generate the loop error signal (RLD__frqErr). Whenever a run length (measured using the DtimOsc's output clock) violates the EFM coding rules (e.g. run length being less than 3 or greater than 11), the RunlDet block generates an error value that, after being integrated by the LpFllt, adjusts the DtimOsc's output frequency to minimize the error. In this way, the DtimOsc's output frequency converges on that of the embedded bit rate and frequency lock is deemed to have occurred when consecutive frames with valid boundaries (e.g. two consecutive run-lengths of 11) are detected.

To facilitate measurement of run lengths, the DtimOsc has an additional four MSBs, that extends its output phase range from $0 \to 2\pi$ to $0 \to 32\pi$. This increased range enables the DtimOsc's phase to increase linearly for the duration of run lengths less than 16 (i.e. $16 \times 2\pi - 32\pi$). Consequently the DtimOsc's output phase (PD__phiCum signal from the phase detector) at the crossover points may be used directly to estimate the pulse run length.

When the RunIDet block has detected valid frame synchronization (two consecutive run-lengths of 11), it calculates the phase adjustment signal (RLD__phiOffs) required to centre the DtimOsc's output clock on the last frame synchronization run length. Once frequency lock has been established, this offset is applied to create a good initial condition (addition of this offset should place the DtimOsc phase very close to its correct value) for the phase loop that sets the correct Dtim Osc phase.

In this mode, the phase detector (PhiDet) block generates a loop error and the low-pass filter's integration term is held constant, the frequency calculated by the frequency loop remains unaltered during phase loop operation.

Phase lock is deemed to have occurred when the phase error remains below a user specified level for a user specified number of consecutive run lengths. Once this criteria has been satisfied, the loop may now be reconfigured to operate as an ADPLL, both the proportional and the integral terms of the low pass filter contribute to its output. Thus, allowing changes in phase/frequency to be "tracked".

Once the ADPLL is locked, reliable detection of run lengths is possible. Run lengths might be measured by sampling the incoming high frequency signal with the PLL's output clock. This clearly isn't feasible in the hfsync as the ADPLL output clock is simply a sequence of sample values presenting the clock phase. However, due to the additional 4 MSBs in the DtimOsc output phase value, the EFM Demodulator interface block (EfmDif block) can use the DtimOsc's phase at crossover points (PD__phiCum) to determine the run length that would be measured if it were actually possible to sample the INP__hf signal with the DtimOsc's clock. Once a pulse run length has been determined, the EfmDif block simply generates a pulse of identical run length on the signal HSY__efmData. The run lengths on this hfSync output signal are synchronized to a system clock and so are easily decoded by the block "downstream" of the hfsync for regenerating the pulse.

The hfsync block is configured and controlled by an external processor. The processor interface (ProcIf7) block interfaces the hfSync to this processor.

ADPLL timing for G__c33m/2 ADC-Sampling Rate can process two transitions spaced only two clock cycles apart, the minimum spacing under normal operation. A pipelined architecture is used to implement the ADPLL loop, which embodies a look-ahead scheme to ensure that this creates no delay in the loop and has no impact on loop stability.

The ADPLL essentially synchronizes to a delayed by two ADC-sample periods version of the CXD__hf input signal. When a transition is detected in the CXD__hf signal by changing sign y, we have advance warning by two ADC-sample periods that a transition will be occurring at the ADPLL input and loop variables will need updating.

In the intervening two ADC-sample periods, the PhiDet, LpFilt calculate their new outputs PD__phiErr and LPF__theta, respectively, there is minimal delay, less than one ADC-sample period, in updating the loop and the DtimOsc frequency changes immediately in response to the phase difference arising from this transition.

To calculate a phase error in advance, the PhiDet block needs to know what the output phase of the DtimOsc oscillator will be after the next two ADC-sample periods. This can be calculated by adding twice the LPF__theta value, which represents the oscillator phase increment per ADC sample period, to the current DtimOsc output phase.

The DtimOsc oscillator is an accumulator that accumulates the phase increment (LPF__theta) produced by the low-pass filter (LpFilt block), every ADC sample period. For very low bit rates (e.g. 1×CD spin speed producing max bit rate of approximately 4 Mhz), this DtimOsc update rate is sufficient for run-length detection. For higher bit rates (e.g. 4×spin-speed that produces bit rates of approximately 16 Mhz) the DtimOsc update is too coarse for accurate run-length measurement.

Because the update rate (i.e. frequency at which the oscillator accumulator is clocked) is lower than the frequency of the embedded clock, the run length can not be easily measured, despite the fact that the clock may be perfectly synchronized to the incoming HF signal i.e. the sawtooth waveform (represented—poorly—by the oscillator output samples) passes through its mid-point (i.e. π radians) as the HF signal is crossing the slicing-threshold.

To get around this problem the hfSync has an additional 4 bits added to the most significant end of the DtimOsc accumulator. Consequently, when the DtimOsc's phase is incremented past a multiple of 2π radians, these 4 MSBs increment effectively form a "cycle-count" that memorizes the number of lapsed DtimOsc clock periods. If this cycle-count is appropriately initialized at the start of a pit/land, then (because 4 bits are used to represent the cycle-count) the DtimOsc phase will not roll over/overflow unless the run length exceeds 16 and the transition denoting the end of the pit/land occurs. The run length is simply the difference between the DtimOsc phase at the first transition and the last transition. The run length produced by this calculation is essentially a real number, the four MSBs form the integral part, and the remaining bits form the fractional part. This scheme of run length measurement is more accurate than simply speeding up the update/clock rate of the oscillator accumulator.

The hfsync 32 receives HF data samples from the upstream slicer block 37. To assist slicer 37 in calculating the correct slice level, the hfsync provides phase-error in Phase Locked Loop (PLL) and run length information to block 37.

Further, the HSY_framed signal when asserted, indicates when the hfsync has correctly determined the correct frequency embedded in the HF data from the CD pickup. Thus, runlength information output on HSY_runLen in valid.

Further, the HSY_tracking signal when asserted, indicates that the hfSync is operating as PLL and is phase-locked to the clock embedded in the HF data from the CD pickup. Thus, phase errors output on HSY_phiErr is valid.

It is thus believed that the operation and construction of the present invention will be apparent from the foregoing description. While the method, apparatus, and system shown and described has been characterized as being preferred, it will be readily apparent that various changes and modifications could be made therein without departing from the spirit and scope of the invention as defined in the following claims.

What is claimed is:

1. A digital method of accurately measuring a pulse width in a high frequency signal while utilizing a low sampling rate, said method comprising the steps of:

generating a sawtooth clock waveform with an oscillator having an accumulator register, said waveform ranging in phase from zero (0) to a predetermined multiple of 2π radians;

detecting a first zero-crossing transition of the signal at a leading edge of the signal pulse;

measuring the oscillator phase when the first zero-crossing transition is detected;

initializing the accumulator register most significant bits (MSBs) to adjust the measured first phase increment so that it lies in a range between zero (0) and 2π radians;

accumulating phase increments until a second zero-crossing transition of the signal is detected at a trailing edge of the signal pulse;

measuring a second phase increment when the second zero-crossing transition is detected;

calculating an accumulated phase difference by subtracting the first phase increment from the measured second phase increment; and dividing the accumulated phase difference by 2π to obtain the pulse width.

2. The method of accurately measuring a pulse with in a HF data signal while utilizing a low sampling rate of claim 1 wherein the step of generating a sawtooth clock waveform ranging in phase from zero (0) to a multiple of 2π radians includes the steps of:

generating a first sawtooth clock waveform with an oscillator having an accumulator register, said accumulator register having a least significant end and a most significant end, and said first waveform ranging in phase from zero (0) to 2π radians; and adding a number of bits to the most significant end of the accumulator register, thereby creating a second waveform ranging in phase from zero (0) to a multiple of 2π radians.

3. A method of recovering an embedded bit clock in successive transitions of a digitized high frequency signal, comprising the steps of:

generating a sawtooth waveform having
a phase from 0 to a predetermined multiple of 2π radians;

initializing the phase of the sawtooth waveform in a range of between 0 and 2π radians beginning at a first transition of the high frequency signal;

determining an end of the sawtooth waveform at a second transition of the high frequency signal;

counting the number of 2π radians in the generated sawtooth waveform between the first and second transitions of the high frequency signal; and recovering the bit clock in successive transitions of the digitized high frequency signal by dividing the number of 2π radians counted between the first and second transitions by 2π.

4. The method set forth in claim 3, further comprising the step of:

choosing the predetermined multiple of 2π radians to be at least 4π radians.

5. The method set forth in claim 3, further comprising the step of:

choosing the predetermined multiple of 2π radians to be 12π radians.

6. The method set forth in claim 3, further comprising the step of:

providing an oscillator for generating the sawtooth waveform.

7. The method set forth in claim 3, further comprising the step of:

equalizing and slicing the digitized high frequency signal prior to detecting the first transition of the high frequency signal.

8. The method set forth in claim 3, further comprising the step of:

detecting the first transition of the digitized high frequency signal to begin said counting.

9. The method set forth in claim 8, further comprising the step of:

detecting the second transition of the high frequency signal to end said counting.

10. A system for accurately measuring a pulse width in a high frequency signal while utilizing a low sampling rate, said system comprising:

an oscillator which generates a sawtooth clock waveform ranging in phase from zero (0) to a multiple of 2π radians, said oscillator having an accumulator register which accumulates phase increments;

an interpolator which detects a first transition of the signal at a leading edge of the pulse, and detects a second transition of the signal at a trailing edge of the pulse;

a phase detector which measures the oscillator phase when the interpolator detects the first transition, and measures a second phase increment when the interpolator detects the second transition;

means for initiating the accumulator register most significant bits (MSBs) to adjust the measured first phase increment so that it lies in a range between zero (0) and $2\pi$ radians;

means for calculating an accumulated phase difference by subtracting the initialized first phase increment from the measured second phase increment; and means for dividing the accumulated phase difference by $2\pi$ to obtain the pulse width.

11. An all digital locked loop for recovering a bit clock embedded in a digitized high frequency signal, comprising:

a phase detector providing a digital output in response to a transition of the digitized high frequency signal;

a low pass filter providing an output frequency signal in response to the digital output provided by said phase detector;

a variable oscillator
generating a sawtooth waveform signal ranging in phase from 0 to a predetermined multiple of $2\pi$ radians in response to the output frequency signal from said low pass filter and
providing a radians number signal representing an accumulation of the number of radians provided to said phase detector at a first transition of the high frequency signal and at a second transition of the high frequency signal; and a measuring device providing a frequency, phase signal in response to the accumulated radians number signal and a preselected constant of $2\pi$ radians.

12. The all digital locked loop set forth in claim 11, further comprising:

the preselected constant representing at least $4\pi$ radians.

13. The all digital locked loop set forth in claim 11, further comprising:

the preselected constant representing at least $12\pi$ radians.

14. The all digital locked loop set forth in claim 11, further comprising:

an equalizer to boost an amplitude of narrower pulses while introducing minimal additional inter-symbol interference of the high frequency digitized signal into the high frequency digitized signal.

15. The all digital locked loop set forth in claim 14, further comprising:

a high-pass filter to slice a direct current component from the digitized, equalized signal into a digitized, equalized and sliced high frequency signal.

16. A high frequency control circuit, comprising:

an analog to digital converter to convert a high frequency analog signal into a high frequency digitized signal;

an equalizer to boost the amplitude of narrower pulses while introducing minimal additional inter-symbol interference of the high frequency digitized signal into a high frequency digitized, equalized signal;

a high-pass filter to slice a direct current component from the digitized, equalized signal into a digitized, equalized and sliced high frequency signal; and a high frequency synchronization control loop including
an all digital locked loop for recovering a bit-clock embedded in a digitized high frequency signal having
a phase detector providing a digital output in response to a transition of the digitized high frequency signal,
a low pass filter providing an output frequency signal in response to the digital output signal from the phase detector,
a variable oscillator providing
a sawtooth waveform signal ranging in phase from 0 to a predetermined multiple of $2\pi$ radians to said phase detector in response to the output frequency from said low pass filter and
a radians number signal representing an accumulation of the number of radians provided to said phase detector immediately after a first transition of the high frequency signal and immediately before a second transition of the high frequency signal, and
a measuring device providing a frequency, phase signal in response to the accumulated radians number signal and a preselected constant of $2\pi$ radians.

17. The electrical control loop of claim 16, further comprising:

an event detector to monitor the frequency digitized signal for changes.

* * * * *